No. 626,713. Patented June 13, 1899.
M. MOSKOWITZ.
SELF REGULATING DYNAMO.
(Application filed Oct. 4, 1898.)
(No Model.)
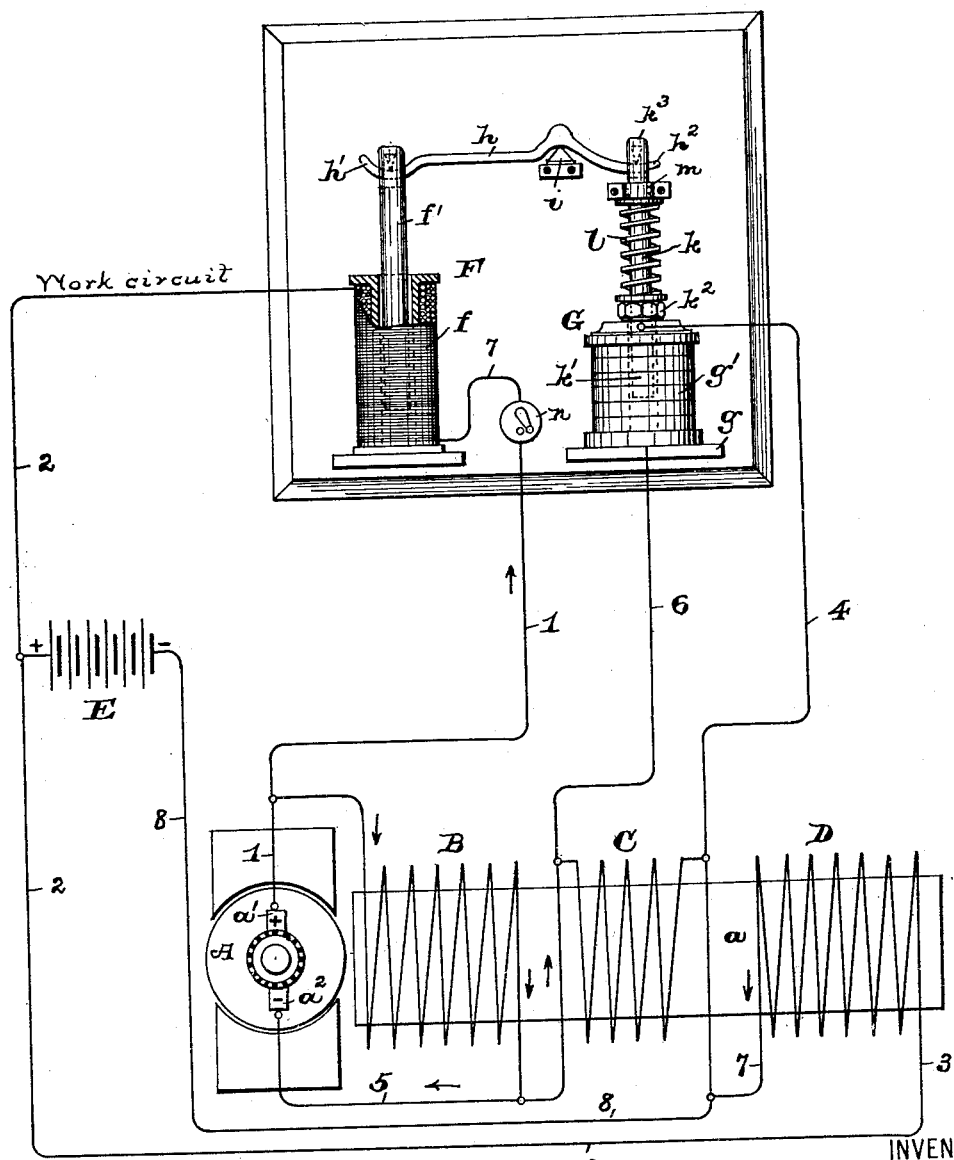
WITNESSES:
Walter H. Talmage.
B. Mortimer Trusdell.
INVENTOR:
Morris Moskowitz,
BY Fred'k C. Fraentzel,
ATTORNEY

UNITED STATES PATENT OFFICE.

MORRIS MOSKOWITZ, OF NEWARK, NEW JERSEY, ASSIGNOR TO THE NATIONAL ELECTRIC CAR LIGHTING COMPANY, OF WEST VIRGINIA.

SELF-REGULATING DYNAMO.

SPECIFICATION forming part of Letters Patent No. 626,713, dated June 13, 1899.

Application filed October 4, 1898. Serial No. 692,590. (No model.)

*To all whom it may concern:*

Be it known that I, MORRIS MOSKOWITZ, a citizen of the United States, residing at Newark, in the county of Essex and State of New Jersey, have invented certain new and useful Improvements in Self-Regulating Dynamos; and I do hereby declare the following to be a full, clear, and exact description of the invention, such as will enable others skilled in the art to which it appertains to make and use the same, reference being had to the accompanying drawing, and to letters and figures of reference marked thereon, which forms a part of this specification.

My present invention has for its primary object to provide a self-regulating dynamo running under variable speeds.

The invention therefore relates more particularly to that class of electrical apparatus in which the electric energy for operating the lamps or other translating devices is obtained from a dynamo-electric machine driven by a variable-speed power, and hence the invention is applicable to a dynamo driven from a rotating car-wheel axle or any other class of dynamo operated from any source of variable-speed power.

The object of this invention therefore is to provide a self-contained self-regulating dynamo or other electric machine which is not entirely dependent upon a battery or other constant source of supply for exciting the fields of the machine to maintain a uniform electromotive force irrespective of the speed of the armature rotation, a battery being used only to assist in sufficiently energizing the field of the dynamo at the beginning to insure the dynamo starting a current when its armature begins to rotate.

It is well known that a common shunt-wound machine when self-excited will with an increase of the armature speed after a predetermined speed of rotation develop an abnormal amount of energy not merely because the increase of speed develops more current in the armature, but because the constantly-rising voltage is being forced through the shunt-winding, and thereby constantly producing increased strength in the magnetic field of the dynamo. This is one reason why in previous inventions pertaining to dynamos operated under variable-speed powers a constant source of current, as from a secondary or storage battery, had to be employed for the field excitation. In an arrangement of this kind all that one has to contend with is the extra amount of energy developed in the armature on account of a higher or increased speed, the field of the dynamo or other like machine being constant. If, however, this field is not constant, but is receiving an extra supply of current in the same proportion of current over and above the proper amount, then the oppositely-wound field-coil employed in these constructions cannot cut down the current sufficiently to make up for such extra supply of current, and in consequence the machine is not a self-regulating dynamo.

In order to render a dynamo which is subject to variable-speed power practical and successful, as in systems of electric train-lighting, a large range, as from five hundred to two thousand revolutions of the armature of the dynamo, is necessary—that is to say, at about five hundred revolutions the dynamo develops its normal output of electromotive force, and this output must be maintained constant throughout a range of armature speed varying from five hundred to two thousand revolutions. I have accomplished this result by my present invention and have produced a self-regulating dynamo running under variable speeds, the principle and operation of which will be hereinafter fully described and finally embodied in the clauses of the claim.

The invention is clearly illustrated in the accompanying drawing which represents a diagrammatic view of the invention, illustrating an arrangement of dynamo subject to variable armature speeds and circuits connected with said dynamo, and a means connected therewith to automatically regulate the current output of the dynamo and to maintain the same constant.

In said drawing, A indicates the dynamo, and *a* is the field of the same.

B indicates the original shunt-winding which is in circuit with the main circuit-wires connected with the pole-terminals of the dynamo, and C indicates a differential series winding which is wound in the opposite direction, as indicated by the arrows in the drawing.

D indicates a high-resistance winding which is wound in the same direction as the original shunt-winding B.

E is an ordinary storage battery in circuit with the high-resistance shunt-winding D, while F indicates the usual construction of solenoid, the coil $f$ of which is of heavy wire and is in circuit with the terminals $a'$ and $a^2$ of the dynamo A by means of the circuit-wires 1, 2, 3, 7, 4, 6, and 5 and the respective field-coils D and C, as will be clearly evident from an inspection of the drawing. The said field-coil D when fed from the battery E is a separately-excited coil; but after a certain increase of speed of the armature of the dynamo when running normally then said coil D becomes a shunt-coil, but said coil being in series with the work and shunt only to the coil C. The plunger $f'$ of the solenoid F is operatively retained in position by the fulcrumal end $h'$ of a suitable arm $h$, which oscillates upon a support $i$.

G is a suitable device which consists of a support $g$, on which there is a number of carbon disks or blocks $g'$, each of which is provided with a centrally-arranged opening, as indicated in dotted outline in the drawing. Arranged in position in said openings in said disks or blocks $g'$ is the lower end $k'$ of a rod $k$, said rod having a nut $k^2$ or other suitable means for causing it to rest upon the upper disk or block of the said device G and having its upper portion slidably arranged in a suitable bearing or bracket $m$. Encircling said rod $k$, between the said bearing or bracket $m$ and the said nut $k^2$, is a spring $l$. Said rod $k$ also has its free end $k^3$ operatively connected with the fulcrumal end $h^2$ of the arms $h$ hereinabove mentioned. The purpose of the said carbon disks or blocks $g'$ is to vary the resistance to the current of electricity passing through them when pressure from said spring $l$ is brought to bear upon the said disks or blocks $g'$ or when the pressure is released in the manner and for the purposes hereinafter more fully set forth.

The operation of the dynamo is as follows: As will be seen from an inspection of the drawing, the high-resistance shunt-circuit of the coil D is closed with the battery E by means of the circuit-wires 3 7 8, and the field $a$ of the dynamo A is just sufficiently energized to insure the dynamo starting a current when its armature begins to rotate. This current which is being generated now passes through the field-coil B and allows the dynamo to build up as a self-excited machine. When a certain increase of speed of the armature of the dynamo is attained, then the voltage or electric output of the dynamo will have become somewhat higher. A suitable switch $n$ in the circuit-wire 1 is now closed and the generated current will at once pass from the dynamo-terminal $a'$ through the wire 1, the coil $f$ of the solenoid F, the wire 2, the battery E, the wire 8, and the differential series coil C. From this coil the current would naturally pass directly back to the dynamo-terminal $a^2$ through the circuit-wire 5 if it were not for the fact that the device G is in circuit with the coil C through the wires 4 and 6. It will thus be evident that the current becomes divided and the same has an opportunity to pass through the carbon disks or blocks $g'$ just as well as through the series coil C. The amount of current that passes through the carbon disks or blocks $g'$ is to be determined by the offered resistance of said carbon disks or blocks and will be in the proper proportion desired. For instance, if the resistance of the carbon disks or blocks equals the resistance of the series coil C then the current will divide equally—that is, one-half of the current will pass through the coil C and the other one-half of the current will pass through the carbon disks or blocks $g'$ of the device G.

As it is the purpose of this invention that the dynamo, which is subject to variable speed, shall produce a constant output of electricity, the device G is so constructed that the current passing through the coil $f$ of the solenoid F will actuate the arm $h$ to cause the carbon disks or blocks $g'$ to vary their resistance automatically and under different conditions due to the increase or decrease of the armature speed of the dynamo. The spring $l$ employed in connection with the device G is adjusted to balance the pull of the iron core $f'$ of the solenoid F, so that it will require a given number of amperes to overcome the tension of the spring, and at that time the resistance of the said disks or blocks $g'$ will begin to vary.

As the dynamo is to generate a constant current under variable speeds, the counter winding or coil C is made with the proper number of turns to demagnetize the dynamo-field at the highest speeds; but this same winding also has this effect that at the lower speeds the dynamo is "held down," so that only a few amperes are generated. It therefore becomes necessary to prevent a large part of the main current generated at the lower speeds from passing through the series winding C. This is accomplished by diverting a certain amount of the current from the coil C and causing it to pass through the carbon disks or blocks $g'$, which tends to cut down the electrical output of the machine by the demagnetization of the field and maintaining such output constant. As soon as the armature speed increases, however, and the dynamo-electric machine begins to generate too much current the coil $f$ of the solenoid F causes the plunger or iron core thereof to be drawn farther down into the said coil $f$, and this movement causes the arm $h$ to move upon its support $i$. The consequent upward movement of the part $h^2$ of the arm $h$ will likewise cause an upward motion of the rod $k$ in its bearing $m$ and in the central openings of the said disks or blocks $g'$ of the device G, and by the compression of the coils of the spring $l$ thereby relieving the said carbon disks or blocks $g'$ of some of the pressure upon them. The spaces between the several disks or blocks are now somewhat greater, which causes the several carbon disks or blocks to offer a greater resistance to the passage of the current through them, and more current will therefore in proper proportion to such increased resistance pass through the series coil C, whereby the dynamo-field is accordingly demagnetized. By this action of the solenoid, which responds immediately to the varying currents passing through its coil $f'$, the disks or blocks $g'$ of the device G will automatically throw in or out a greater or less resistance to the current in proportion to the increasing or decreasing armature speeds, as the case may be, to regulate the current-output through the coil C, and thereby maintaining a constant current of the dynamo under variable speeds of wide ranges, and it will be clearly evident that I have devised a dynamo construction which will at all times deliver a constant electromotive force for all variations of speed over and above a predetermined speed.

Having thus described my invention, what I claim is—

1. The combination, with a working or main circuit, of a dynamo in said main circuit, wound with a differential series coil around the field, said dynamo having a self-excited field-coil in circuit with its armature, and a high-resistance shunt-coil around the field of said dynamo, fed from a battery in circuit with said high-resistance shunt-coil, substantially as and for the purposes set forth.

2. The combination, with a working or main circuit, of a dynamo in said main circuit, wound with a differential series coil around the field, said dynamo having a self-excited field-coil in circuit with its armature, a high-resistance shunt-coil around the field of said dynamo, fed from a battery in circuit with said high-resistance shunt-coil, and a resistance device in circuit with said differential coil and the armature of said dynamo, substantially as and for the purposes set forth.

3. The combination, with a working or main circuit, of a dynamo in said main circuit, wound with a differential series coil around the field, said dynamo having a self-excited field-coil in circuit with its armature, a high-resistance shunt-coil around the field of said dynamo, fed from a battery in circuit with said high-resistance shunt-coil, and a resistance device in circuit with said differential coil and the armature of said dynamo, comprising a solenoid F, a device G comprising separable carbon disks or blocks $g'$, and a means actuated from said solenoid for causing an increase or decrease of pressure on the said carbon disks or blocks $g'$, substantially as and for the purposes set forth.

4. The combination, with a working or main circuit, of a dynamo in said main circuit, wound with a differential series coil around the field, said dynamo having a self-excited series coil in circuit with its armature, a high-resistance shunt-coil around the field of said dynamo, fed from a battery in circuit with said high-resistance shunt-coil, and a resistance device in circuit with said differential coil and the armature of said dynamo, comprising a solenoid F, a device G comprising separable carbon disks or blocks $g'$, and a means actuated from said solenoid for causing an increase or decrease of pressure on the said carbon disks or blocks $g'$, consisting of an oscillating arm $h$, and a spring-actuated rod $k$ pivotally connected with said arm $h$, substantially as and for the purposes set forth.

5. A dynamo-electric machine, subject to variable armature speed, having a self-excited field-coil in shunt with its armature, a high-resistance coil wound around the field of said dynamo, fed from a battery in circuit with said high-resistance coil, and a differental series coil in the main circuit with the armature of the dynamo, said high-resistance coil coacting with said self-excited field-coil to maintain or increase the field magnetism of said dynamo, substantially as and for the purposes set forth.

6. A dynamo-electric machine, subject to variable armature speed, having a self-excited field-coil in shunt with its armature, a high-resistance coil wound around the field of said dynamo, fed from a battery in circuit with said high-resistance coil, a differential series coil in the main circuit with the armature of the dynamo, said high-resistance coil coacting with said self-excited field-coil to maintain or increase the field magnetism of said dynamo, and a resistance device in circuit with said differential series coil and the armature of said dynamo, substantially as and for the purposes set forth.

7. A dynamo-electric machine, subject to variable armature speed, having a self-excited field-coil in shunt with its armature, a high-resistance coil wound around the field of said dynamo, fed from a battery in circuit with said high-resistance coil, a differential series coil in the main circuit with the armature of the dynamo, said high-resistance coil coacting with said self-excited field-coil to maintain or increase the field magnetism of said dynamo, and a resistance device in circuit with said differential series coil and the armature of said dynamo, comprising a solenoid F, a device G comprising separable carbon disks or blocks $g'$, and a means actuated from said solenoid for causing an increase or decrease of pressure on the said carbon disks or blocks $g'$, substantially as and for the purposes set forth.

8. A dynamo-electric machine, subject to variable armature speed, having a self-excited field-coil in shunt with its armature, a high-resistance coil wound around the field of said dynamo, fed from a battery in circuit with said high-resistance coil, a differential series coil in the main circuit with the armature of the dynamo, said high-resistance coil coacting with said self-excited field-coil to maintain or increase the field magnetism of said dynamo, and a resistance device in circuit with said differential series coil and the armature of said dynamo, comprising a solenoid F, a device G comprising separable carbon disks or blocks $g'$, and a means actuated from said solenoid for causing an increase or decrease of pressure on the said carbon disks or blocks, consisting of an oscillating arm $h$, and a spring-actuated rod $k$ pivotally connected with said arm $h$, substantially as and for the purposes set forth.

In testimony that I claim the invention set forth above I have hereunto set my hand this 24th day of September, 1898.

MORRIS MOSKOWITZ.

Witnesses:
FREDK. C. FRAENTZEL,
WALTER H. TALMAGE.